March 22, 1966     L. A. JOBE     3,241,599

EVAPORATOR CONTROL METHOD AND APPARATUS THEREFOR

Filed July 10, 1963

INVENTOR.
L. A. JOBE
BY Young + Quigg
ATTORNEYS

United States Patent Office

3,241,599
EVAPORATOR CONTROL METHOD AND
APPARATUS THEREFOR
Lowell A. Jobe, Idaho Falls, Idaho, assignor to Phillips
Petroleum Company, a corporation of Delaware
Filed July 10, 1963, Ser. No. 294,063
4 Claims. (Cl. 159—44)

This invention relates to an improved method of and apparatus for controlling an evaporation process. In another aspect, this invention relates to a method of and apparatus for controlling an evaporation process combining feed forward and feedback methods of control.

In a conventional evaporation process, a property of the product withdrawn from the evaporation zone representative of the effectiveness of the process is measured and an input process variable manipulated responsive thereto. For example, the concentration of the solute in the product withdrawn from the evaporation zone is measured and where steam, for example, is employed to heat the evaporation zone, the rate of steam to the evaporation zone is manipulated responsive to the solute concentration measurement. If the rate of flow of steam to the evaporation zone is adjusted or manipulated in response to analysis of the product stream, the effectivneess of the control system is dependent upon the characteristics of the evaporation process. The characteristics of the evaporation process are manifested by the evaporation product response to changes in an input process variable.

A change in the rate of flow of feed to the evaporation zone will, for example, produce a change in the product withdrawn from the evaporation zone, but said change in the product will not become apparent until a period of time has elapsed. This period of time is known as dead time and is detrimental to process control systems because of excessive phase shift. Dead time in a process can be defined as a time lapse between the initiation of a change in a process and the detection of the effect of the change upon the process.

Accordingly, an object of my invention is to provide an evaporator control system.

Another object of my invention is to provide a method and apparatus for controlling an evaporation process combining feed forward and feedback methods of control.

Other objects, advantages and features of my invention will become readily apparent to those skilled in the art from the following description, drawings and appended claims.

Broadly, I have discovered a method and apparatus for controlling an evaporation process whereby an input process variable is manipulated in response to a predictive change in said evaporation process and said input variable further manipulated in response to a measurement representative of the effectiveness of said evaporation process.

Figure 1:
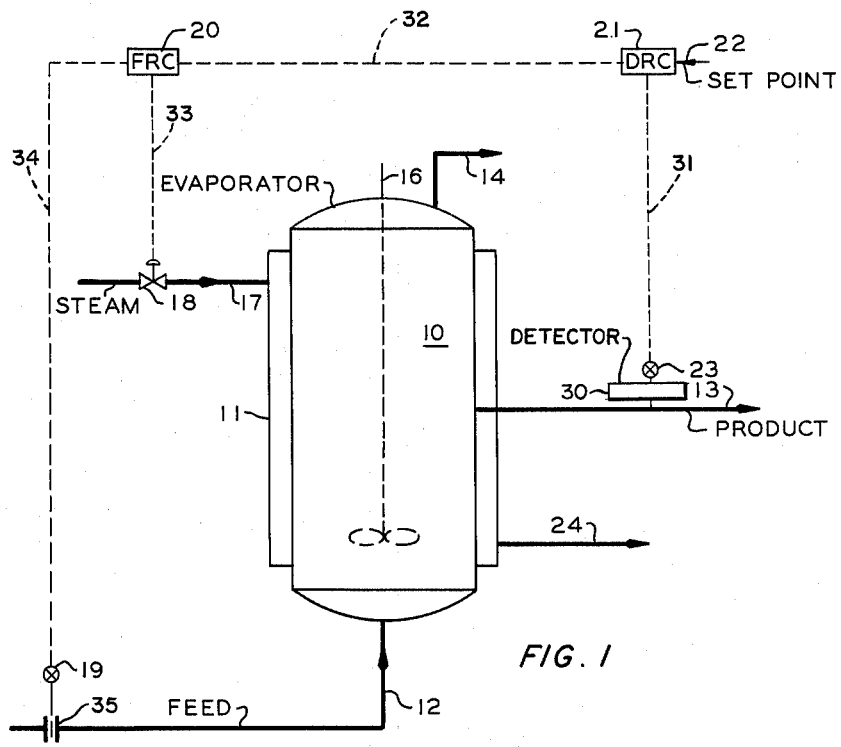
FIGURE 1 is a schematic representation of one embodiment of the inventive control method.

Referring to FIGURE 1, there is illustrated the inventive method of controlling the operation of an evaporator 10. A means 16 for agitating a feed mixture passed to evaporator 10 is positioned within evaporator 10. A jacket 11 surrounds evaporator 10. Steam is passed to jacket 11 via conduit means 17 and valve means 18 and steam condensate withdrawn from jacket 11 via conduit means 24.

A feed mixture comprising a solvent and a solute is passed via conduit means 12 to the lower region of vertical evaporator 10. Vaporous solvent is withdrawn from the upper region of vertical evaporator 10 via conduit means 14. Product comprising solvent and solute is withdrawn from evaporator 10 via conduit means 13.

The rate of flow of feed through conduit 12 is measured by a conventional orifice means 35 and a signal transmitted by a conventional rate of flow transmitter 19 via conduit 34 to a conventional flow-recorder-controller 20. Flow-recorder-controller 20 manipulates the rate of flow of steam through conduit 17 by a signal transmitted via conduit 33 to valve means 18, thereby opening and closing valve 18 responsive to the rate of flow signal transmitted from transmitter 19 to flow-recorder-controller 20 and a set point hereinafter further described.

The desired ratio of steam to feed passed to evaporator 10 for a constant steam pressure transmitted to conduit 17 is predetermined. Therefore, the signal transmitted from transmitter 19 while indicating the rate of flow of feed to evaporator 10 also represents a required rate of flow of heat (steam) to jacket 11. Thus, as the rate of flow of feed to evaporator 10 varies, the rate of flow of steam to jacket 11 is manipulated responsive thereto in a predictive or feed forward method of control.

A property of the product output process variable withdrawn from evaporator 10 via conduit means 13 representative of the efficiency of the evaporation process is measured. As illustrated in FIGURE 1, the density of the product is measured by, for example, measuring the specific gravity of the product with a detector 30, and a signal representative of said density measurement is transmitted by a conventional transmitter 23 via conduit 31 to a density-recorder-controller 21. Density-recorder-controller 21 compares this input signal received from transmitter 23 with a set point 22 representative of a desired product density measurement. Density-recorder-controller 21, responsive to the signal transmitted from transmitter 23 and set point 22, transmits a signal via conduit 32 to flow-recorder-controller 20 manipulating the set point of flow-recorder-controller 20 so as to maintain a desired product density. Thus, the rate of flow of heat to jacket 11 is manipulated responsive to the rate of flow of feed to evaporator 10 in a feed forward method of control and further manipulated responsive to a measurement representative of the effectiveness of the evaporation process in a feedback method of control.

By combining the feed forward and feedback methods of control, I have provided a method of control eliminating the effect of process dead time normally attendant with conventional methods of control by (1) predicting the effect upon the process due to a change in an input process variable, and (2) manipulating a second input process variable in a predictive manner responsive to the changes in the first said input process variable. A product having the desired density is insured by measuring a property of the product representative of the density and further manipulating the second input process variable responsive to the density measurement.

Figure 2:
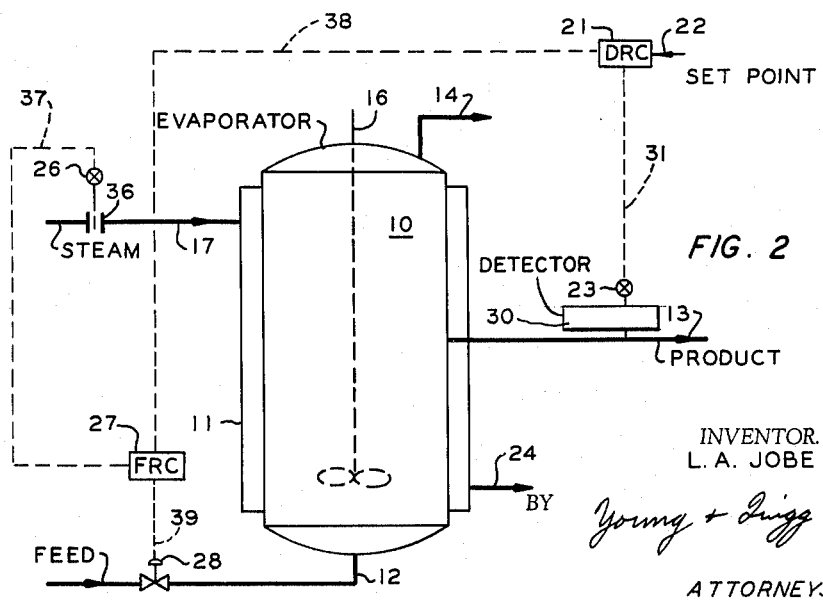
FIGURE 2 is a schematic representation of a second embodiment of the inventive control method.

Referring to FIGURE 2, a second embodiment of the inventive method of control is illustrated. The rate of flow of steam through conduit 17 is measured by a conventional orifice means 36 and a single representative of said rate of flow measurement is transmitted by a conventional transmitter 26 in conduit 37 to a conventional flow-recorder-controller 27. Flow-recorder-controller 27 opens and closes valve 28 via a signal transmitted through conduit 39 to valve means 28 responsive to the rate of flow measurement in conduit 17 and a set point hereinafter described. The rate of flow of feed from an upstream source to valve 28 is maintained constant. The desired ratio of steam to feed having been predetermined, the signal transmitted from transmitter 26 to flow-recorder-controller 27 is also representative of a required feed to evaporator 10.

The density of the product withdrawn from evaporator 10 via conduit means 13 is determined by the heretofore described method and a signal representative of said measurement transmitted from transmitter 23 to density-recorder-controller 21. Density-recorder-controller 21 transmits a signal via conduit 38 to flow-recorder-controller 27 as a set point adjustment of flow-recorder-controller 27 responsive to the density measurement and set point 22. Thus, the rate of flow of feed to evaporator 10 is manipulated responsive to the rate of steam flow to jacket 11 and further manipulated responsive to a density measurement of the product withdrawn from evaporator 10.

The following example is presented as illustrative of the effectiveness of the inventive method of control. It is not intended that the invention should be limited thereto.

*Example*

Pineapple juice having the following composition:

| | Volume percent |
|---|---|
| Sugars | 14.0 |
| Acid (citric) | 0.8 |
| Pineapple esters (ethyl and methyl esters of acetic, butyric, caproic and caprylic acids) | 2.5 |
| Ethyl alcohol | 1.3 | is passed to evaporator 10 via conduit 12. Evaporator 10 is maintained at a temperature of 70° F. and at a pressure of 0.5 p.s.i.a. by the inventive method of control illustrated in FIGURE 1. A vapor stream comprising

| | Volume percent |
|---|---|
| Esters | 0.6 |
| Ethyl alcohol | 1.8 |
| Water | 97.6 | is withdrawn from evaporator 10 via conduit means 14. A liquid stream having a sugar concentration of 20.0 volume percent is withdrawn from evaporator 10 via conduit means 13. During the operation of evaporator 10, variations of pineapple juice feed flow rate of ±15 to 22 percent from the mean flow rate did not result in a change in the sugar concentration of the product withdrawn from evaporator 10 via conduit 13.

Various modifications of this invention can be made, or followed, in the light of the foregoing disclosure and discussion without departing from the spirit or the scope thereof.

I claim:

1. In an evaporation process which comprises separating solvent from a solute-solvent feed mixture by heat vaporization of at least a portion of said solvent in an evaporation zone, and withdrawing from said evaporation zone a product solute-solvent mixture; the method of control which comprises measuring the rate of flow of said feed mixture to said evaporation zone, passing a first signal representative of said rate of flow measurement to a first control zone, measuring the concentration of said solute in said product solute-solvent mixture, passing a second signal representative of said concentration measurement to a second control zone, comparing said second signal with a set point in said second control zone representative of a desired concentration of said solute in said solute-solvent product mixture, passing a third signal responsive to the resultant comparison from said second control zone to said first control zone, and passing a fourth signal from said first control zone to a means for manipulating the rate of flow of heat to said evaporation zone, thereby manipulating said rate of flow of heat responsive to said feed rate of flow measurement, said solute concentration measurement and said set point of said second control zone.

2. In an evaporation process which comprises separating solvent from a solute-solvent feed mixture by heat vaporization of at least a portion of said solvent in an evaporation zone, and withdrawing from said evaporation zone a product solute-solvent mixture; the method of control which comprises measuring the rate of flow of heat to said evaporation zone, passing a first signal representative of said rate of heat flow measurement to a first control zone, measuring the concentration of said solute in said product solute-solvent mixture, passing a second signal representative of said concentration measurement to a second control zone, comparing said second signal with a set point in said second control zone representative of a desired concentration of said solute in said solute-solvent product mixture, passing a third signal responsive to the resultant comparison from said second control zone to said first control zone, and passing a fourth signal from said first control zone to a means for manipulating the rate of flow of said feed mixture to said evaporation zone, thereby manipulating said rate of flow of heat mixture responsive to said heat rate of flow measurement, said solute concentration measurement, and said set point of said second control zone.

3. Apparatus comprising a vessel, a liquid feed inlet conduit means in communication with said vessel, vapor outlet conduit means in communication with the upper region of said vessel, liquid product outlet conduit means in communication with said vessel, means for heating said vessel, means for measuring the rate of liquid flow through said liquid feed conduit inlet means, a first control means, means for forming and transmitting to said first control means a first signal representative of said rate of flow measurement, means for measuring a property of a liquid flowing through said liquid product outlet conduit means representative of the composition thereof, a second control means, means for forming and transmitting a second signal representative of said composition measurement to said second control means, means for forming and transmitting a third signal from said second control means to said first control means responsive to said second signal and a set point representative of a desired composition of said liquid to flow through said liquid product outlet conduit means, valve means for manipulating the rate of flow of heat to said means for heating; and means for forming and transmitting a fourth signal from said first control means to said valve means responsive to said first and third signals, and thereby manipulating said valve means responsive to said fourth signal.

4. Apparatus comprising a vessel, liquid feed inlet conduit means in communication with said vessel, vaporous outlet conduit means in communication with the upper region of said vessel, liquid product outlet conduit means in communication with said vessel, means for heating said vessel, means for measuring the rate of flow of heat to said means for heating, a first control means, means for forming and transmitting to said first control means a first signal representative of said heat rate of flow measurement, means for measuring the composition of a liquid flowing through said liquid product outlet conduit means, a second control means, means for forming and transmitting a second signal representative of said composition measurement to said second control means, means for forming and transmitting a third signal from said second control means to said first control means responsive to said second signal and a set point representative of a desired composition of said liquid to flow through said liquid product outlet conduit means, valve means for manipulating the rate of liquid flow through said liquid feed inlet conduit means, and means for forming and transmitting a fourth signal from said first control means to said valve means responsive to said first and third signals, thereby manipulating said valve means responsive to said fourth signal.

References Cited by the Examiner
UNITED STATES PATENTS

| | | | |
|---|---|---|---|
| 1,766,622 | 6/1930 | Frey | 159—44 |
| 2,073,825 | 3/1937 | Beck et al. | 159—44 |
| 2,287,995 | 6/1942 | Haugh | 159—44 X |
| 2,519,608 | 8/1950 | Stilson | 159—44 |
| 2,580,651 | 1/1952 | Boyd | 202—160 X |
| 2,800,955 | 7/1957 | Honig et al. | 159—44 |
| 2,835,116 | 5/1958 | Miller. | |
| 2,900,334 | 8/1959 | Miller | 196—132 X |
| 2,985,565 | 5/1961 | Bellinger | 202—160 |

ROBERT F. BURNETT, *Primary Examiner.*

NORMAN YUDKOFF, *Examiner.*